United States Patent [19]

Hewlett

[11] Patent Number: 4,463,776

[45] Date of Patent: Aug. 7, 1984

[54] FLUID PRESSURE RELIEF SYSTEM ACTUATOR

[75] Inventor: Kelvin J. Hewlett, Leicestershire, England

[73] Assignee: Crosby Valve and Engineering Company, Limited, Leicestershire, England

[21] Appl. No.: 354,098

[22] PCT Filed: Jun. 11, 1981

[86] PCT No.: PCT/GB81/00100

§ 371 Date: Jan. 29, 1982

§ 102(e) Date: Jan. 29, 1982

[87] PCT Pub. No.: WO81/03688

PCT Pub. Date: Dec. 24, 1981

[30] Foreign Application Priority Data

Jun. 13, 1980 [GB] United Kingdom ............... 8019492
Jun. 13, 1980 [GB] United Kingdom ............... 8019493

[51] Int. Cl.³ ..................... F16K 17/10; F22B 37/44
[52] U.S. Cl. .................................. 137/495; 137/488
[58] Field of Search ............... 137/485, 488, 495, 494

[56] References Cited

U.S. PATENT DOCUMENTS 2,162,779  6/1939  Leutwiler ........................ 137/495
2,528,440 10/1950  Kmiecik ....................... 137/495 X

FOREIGN PATENT DOCUMENTS 5101 10/1979 European Pat. Off. .
1253027 11/1971 United Kingdom .
1264119  2/1972 United Kingdom .

Primary Examiner—Alan Cohan
Attorney, Agent, or Firm—Merchant, Gould, Smith, Edell, Welter & Schmidt

[57] ABSTRACT

An actuator head is provided for a pressure relief valve (1) having a valve element (11) spring biased to a closed position and arranged to be movable under the action of a fluid pressure medium in order to allow the escape of the fluid pressure medium through the valve for pressure relief purposes. The actuator head comprises an actuator (3) which is coupled with the valve element (11) and has a member (21) displaceable in response to fluid pressure applied thereto. A linkage (22, 19, 12) couples together the valve element (11) and the actuator (3) and has a lost-motion connection (72) which allows the valve element (11) to move against its spring biasing (13) for pressure relief purposes without imparting movement to the displaceable member (21) of the actuator (3). Biasing means (27) is arranged to oppose displacement of the displaceable member (21) of the actuator (3), and control means (4, 5) is provided to control the supply of fluid pressure to said displaceable member (21).

The displaceable member (21) is arranged to be displaceable upon the application of fluid pressure to the member by said control means, so as to apply a supplementary valve-closing load to the valve element (11) via the linkage (22, 19, 12).

In addition, a fail-safe mechanism is coupled with the linkage in such as way that the mechansim is movable with and forms part of the linkage during normal application of a supplementary loading by the actuator (3), but the mechanism is convertible, when the displaceable member (21) remains unintentionally in a displaced position under the action of fluid pressure and when the valve element (11) of the relief valve (1) carries out relief pressure movement, to a fail-safe mode in which the mechanism no longer forms part of the linkage (22, 19, 12) whereby no action is exerted between the actuator (3) and the valve element (11) via the linkage during the relief pressure movement of the valve element (11).

10 Claims, 11 Drawing Figures

FLUID PRESSURE RELIEF SYSTEM ACTUATOR

This invention relates to an actuator for a fluid pressure relief system.

As is well known, fluid pressure relief valves or "safety valves" are provided to relieve automatically any excessive pressure build-up which may occur in a pressure vessel (or chamber). When a pre-determined pressure level is exceeded in the pressure vessel, a valve element of the relief valve lifts-off its seating against spring biasing in order to allow the escape, through the valve, of the fluid medium which is at an excessive pressure level, until such time as the pressure level falls back to a valve below the predetermined level when the spring biasing re-seats the valve element.

It is known to provide an actuator which is coupled via a linkage with the valve element, and which is operable, when fluid under pressure is supplied to the actuator, to raise the valve element from its seat against the spring biasing.

The operation of the actuator is controlled by a control valve which, in turn, is controlled by a pilot pressure instrument which responds to the pressure in the pressure vessel with which the relief valve is used. The pilot pressure instrument has a separate pressure connection with the vessel, and is able to control the pressure therein, at selected levels which are lower than the predetermined maximum safe pressure as determined by the valve element and its spring biasing, by effecting controlled opening of the relief valve via the control valve and the actuator.

It is also known to provide, in the linkage between the valve element and the actuator, a lost-motion connection which allows the actuator to operate the valve element, but which also allows the valve element to lift-off its seating (when the safe pressure is exceeded) without imparting action on the actuator via the linkage.

In the known arrangement the seating of the valve element is provided solely by means of its spring biasing and, inevitably, over a period of time, the performance of the relief valve deteriorates so that unintentional leakage of pressure medium occurs from the pressure vessel. This may arise due to improper seating of the valve element, e.g. caused by uneven wear and/or the build-up of deposits on the seating or valve element, or by a reduction in the effectiveness of the spring biasing due to temperature relaxation or creep.

Having regard to the enormous increases in energy costs during recent years, the unintentional loss of pressure medium e.g. steam represents a significant waste of energy, so there exists therefore a need to provide means for applying a controllable supplementary loading on the valve element in order to counter such losses.

The present invention in one of its aspects, seeks to provide such means in simple manner for a fluid pressure relief system.

According to one aspect of the invention there is provided an actuator head adapted for mounting in a fluid pressure relief system comprising a relief valve having a valve element spring biased to a closed position and arranged to be movable under the action of a fluid pressure medium in order to allow the escape of the fluid pressure medium through the valve for pressure relief purposes, said actuator head comprising:

an actuator adapted for coupling with said valve element and having a member displaceable in response to fluid pressure applied to said member;

a linkage for coupling together the valve element and the actuator and having a lost-motion connection which allows the valve element to move against its spring biasing for pressure relief purposes without imparting movement to the displaceable member of the actuator;

biasing means arranged to oppose displacement of said member of the actuator, upon the application of fluid pressure to the member;

and control means for controlling the supply of fluid pressure to said member;

in which said member is arranged to be displaceable upon the application of fluid pressure to the member by said control means, so as to apply a supplementary valve-closing load to said valve element via said linkage.

According to a second aspect of the invention there is provided an actuator head adapted for mounting in a fluid pressure relief system comprising a relief valve having a valve element spring biased to a closed position and arranged to be movable under the action of a fluid pressure medium in order to allow the escape of the fluid pressure medium through the valve for pressure relief purposes, said actuator head comprising:

an actuator having a member displaceable in response to fluid pressure applied to said member and adapted for coupling with said valve element whereby displacement of said member effects displacement of the valve element;

a linkage for coupling together the valve element and the actuator;

biasing means arranged to oppose displacement of said member of the actuator, upon the application of fluid pressure to the member;

control means for controlling the supply of fluid pressure to said member;

and a fail-safe mechanism coupled with said linkage in such a way that the mechanism is movable with and forms part of the linkage when said member of the actuator is displaced by the application of fluid pressure thereto, but said mechanism is convertable, when the member of the actuator remains unintentionally in a displaced position under the action of fluid pressure and when the valve element of the relief valve carries out relief pressure movement, to a fail-safe mode in which the mechanism no longer forms part of the linkage whereby no action is exerted between the actuator and the valve element via the linkage during the relief pressure movement of the valve element.

According to a preferred embodiment of the invention, the first and second aspects of the invention are combined.

In order to control the supply of fluid pressure medium to the actuator, it is preferred that a three-way ON/OFF valve is provided to which is connected a pressure supply line, an exhaust line, and a delivery line leading to a chamber defined in the actuator on one side of the displaceable member thereof (which may be a diaphragm). A pilot control instrument is connected to the three-way valve in order selectively to control the connection through the valve of the delivery line to the supply line or to the exhaust line whereby the supplementary load to the valve element is applied or removed respectively.

In order to allow for testing of the relief valve to be carried out at any desired intervals, it is preferred that a manually operable lever is coupled with the linkage and is movable between an inoperative mode in which it allows the linkage to transmit load between the actuator and the valve element, and an operative, valve-testing mode in which the lever moves the linkage so as to raise the valve element from its seating.

In order to move the valve element away from its closed position during shut-down of a plant employing a fluid pressure medium which is controlled by the fluid pressure medium relief system, an auxiliary actuator may be coupled with said valve element, the auxiliary actuator having an auxiliary member which is displaceable in response to fluid pressure applied thereto, when no pressure is applied to the displaceable member of said first mentioned actuator.

Preferably, the auxiliary actuator has a fluid supply line to which a portable source of fluid pressure medium may be attached.

The auxiliary actuator may be connected to an actuating spindle which operates the valve element and to which, preferably, also said first mentioned actuator is coupled.

To enable the valve element to move from its closed position under the action of fluid pressure medium for pressure relief purposes, without imparting movement to the displaceable members of the actuator and the auxiliary actuator, it is preferred that a lost-motion connection is provided in the coupling between the actuator and auxiliary actuator and the valve element.

One embodiment of actuator according to the invention for a fluid pressure relief system will now be described in detail, by way of example only, with reference to the accompanying drawings, in which.

Figure 1:
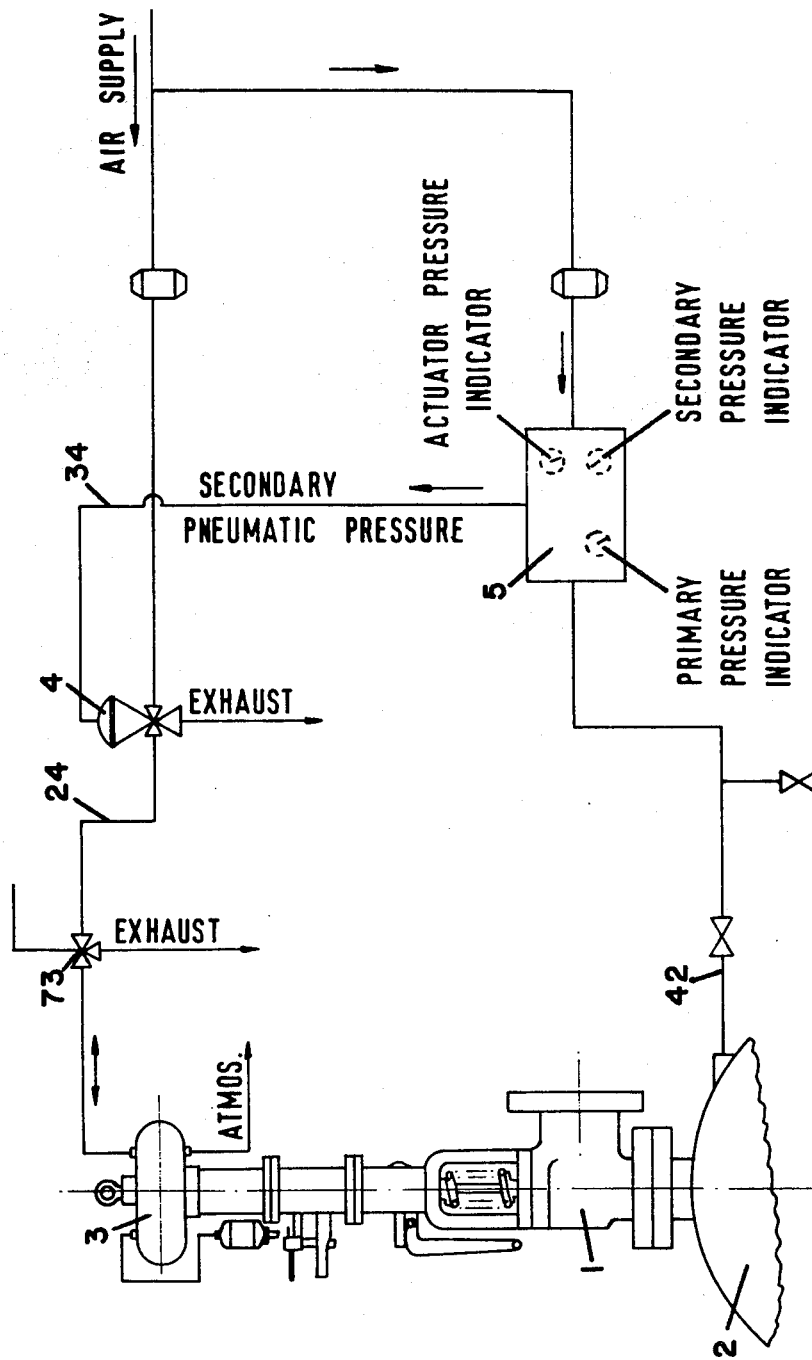
FIG. 1 is a schematic illustration of the fluid pressure relief system.

Referring now to the drawings, there is shown a fluid pressure relief system which comprises a relief valve, which may comprise any suitable relief valve of conventional construction, and which is intended to control the pressure of a fluid pressure medium in a pressure vessel or chamber. The fluid pressure medium which is having its pressure controlled may be steam, vapour, hydrocarbons and many other gases and vapours.

In FIG. 1, there is shown diagrammatically a pressure vessel 2 which has a relief or safety valve 1 mounted thereon so as to relieve excessive pressure within the vessel. The valve 1 is fitted with a diaphragm-type actuator 3 which, in the illustrated arrangement, comprises an actuator head which is adapted for mounting on the valve 1 so as to form an integral part of the valve, and which is arranged to be operated by the application thereto of any suitable fluid pressure medium such as compressed air or gas. The actuator 3 is adapted to be fed with fluid pressure medium from an appropriate supply via a three-way ON/OFF change-over valve 4.

The opening and closing of the valve 4 is controlled, preferably pneumatically, by a pilot instrument 5 which is arranged to effect, at a pilot set relieving pressure, rapid operation of the ON/OFF valve 4 to permit discharge of fluid from the actuator 3 for the purposes of opening of the relief valve 1.

Figure 2:
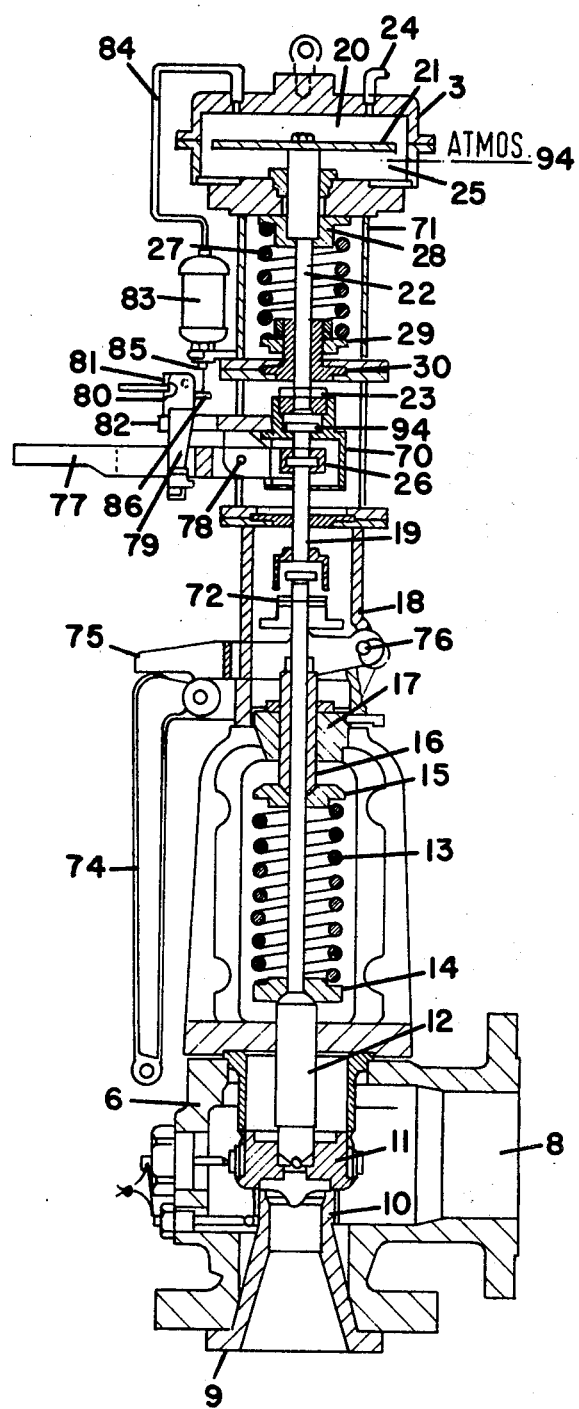
FIG. 2 is a longitudinal sectional view of a relief valve of the system, and an actuator for the system.

Referring now to FIG. 2, the relief valve 1 is illustrated in more detail and comprises a body 6 having an inlet 7 and an outlet 8, the inlet being fitted with a tapered nozzle 9 provided at its upper end with a seating 10 engageable by a closeable valve element in the form of a valve disc 11 which is carried by a spindle 12. The valve disc 11 is loaded by a spring 13, confined between lower and upper washers 14, 15, the lower washer 14 resting on a shoulder of the spindle and the upper washer 15 being engaged by a screw threaded sleeve 16 screwed into a bonnet casing part 17 of the valve. The sleeve 16 is axially adjustable to enable the spring-loading of the valve disc 11 to be varied. The spindle 12 extends upwardly into an intermediate casing part 18 of the valve and is operatively connected by parts including an intermediate rod 19 to a fail-safe mechanism housing 70. The housing 70 is screwed and locked in position by a nut 23 and is connected by a rod 22 to the actuator 3.

The actuator 3 comprises an upper pressure chamber 20 supplied with air or gas via a pipe 24, and a lower space or chamber 25 separated from chamber 20 by a diaphragm assembly 21. The chamber 25 is permanently connected to atmosphere via outlet connection 94. The diaphragm assembly 21 transmits a supplementary load to the fail-safe housing 70 by means of rod 22 when air or gas pressure is introduced into chamber 20. A trunnion 26 is operatively connected to housing 70 so as, under normal conditions, to transmit the diaphragm load to intermediate rod 19.

The fail-safe mechanism comprises a hand preset lever 77 which is integral with the trunnion 26 and which is mounted on the housing 70 via a pivot pin 78. The lever 77 can be latched in the UP position as shown by means of a hinger trigger arm 79 which is biased to hold this position of the lever 77 by a torsion spring 80. The trigger arm 79 pivots on a fulcrum pin 81 and is integral with a trunnion housing platform 82.

Under normal conditions of actuator operation, the fail-safe assembly will ascend and descend as a whole as an integral part of the actuator movement, with the pre-set hand lever 77 latched in the up position.

The operative connection between the intermediate rod 19 and the relief valve 1 comprises a primary lost motion coupling 72 which enables the rod 19 to descend and apply a load directly on to relief valve spindle 12 and thereby apply a supplementary load on valve disc 11 which is engageable with nozzle seating 10, when fluid pressure is introduced into chamber 20. This supplementary load acts in conjunction with the biasing provided by spring 13 in order to seat the valve disc 11 in its closed position.

Biasing means is provided for the actuator 3, which is arranged to oppose the displacement of the diaphragm 21 when pressure is introduced into chamber 20, this biasing means comprising an actuator spring 27 which is confined between upper and lower spring seats 28 and 29 respectively, the upper seat 28 being engaged by a shoulder on rod 22 which passes through seats 28 and 29 and which is locked to housing 70 by the nut 23. Downward movement of the rod 22, which is equal to the "lift" of the valve, compresses the actuator spring 27.

The actuator spring 27 serves a dual purpose. In the first instance, upon removal of pressure from the chamber 20 above the diaphragm 21, the spring raises the diaphragm 21 and the intermediate rod 19 upwardly, thereby removing the supplementary load previously applied by the actuator to the valve spindle 12. The actuator spring 27 raises the actuator assembly a distance, equal to the normal lift of the relief valve, and allowing free movement of the relief valve spindle 12 via the lost motion coupling 72.

The second function of the actuator spring 27 is to vary the intensity of the supplementary load (applied by the diaphragm 21) via the intermediate rod 19 and spindle 12, directly on to the valve disc 11 and nozzle seating 10. The lower spring seat 29 is engaged by a screw threaded sleeve 30 which is held captive in casing structure 71. Clockwise rotation of the lower spring seat 29 compresses the actuator spring 27, and reduces the applied supplementary load on the valve disc 11. Anticlockwise rotation increases the applied supplementary load on the valve disc, within the prescribed limits of the actuator spring.

Figure 3:
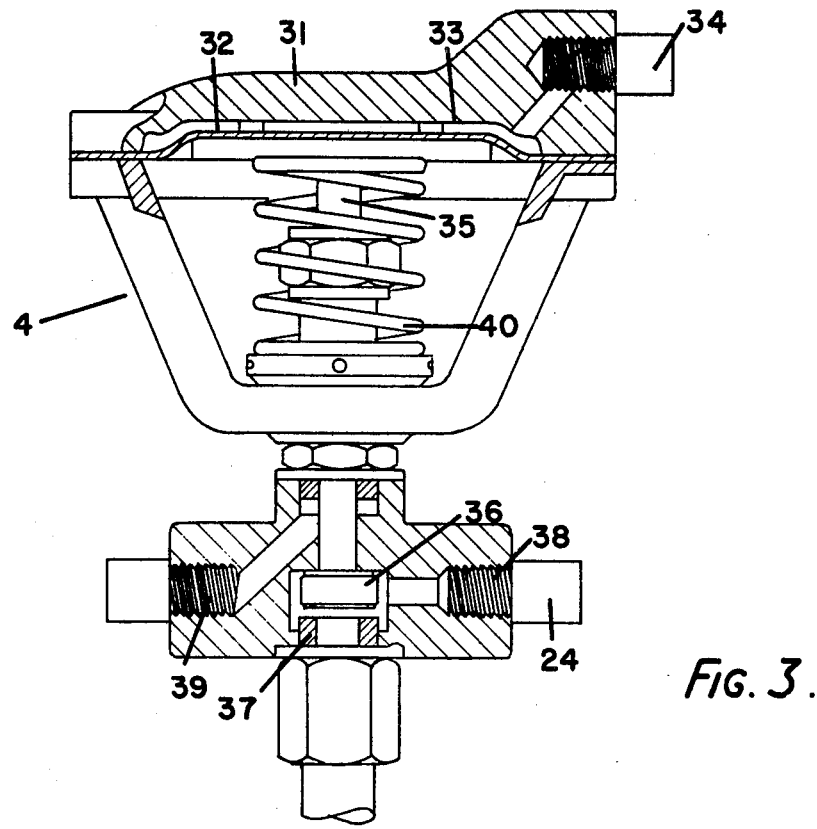
FIG. 3 is an axial sectional view of a three-way on/-off valve of the system.

The construction of the three-way ON/OFF valve 4 is shown in more detail in FIG. 3, and comprises a casing 31 fitted with a diaphragm 32 defining within the casing a top space 33 communicating with a pipe line 34 which extends to a pilot control instrument 5 (see FIGS. 1,4,5 and 6). A spindle 45 depending from the diaphragm, carries at its lower end a valve disc 36 for controlling communication between three ports 37, 38 and 39, port 37 being open to atmosphere or otherwise arranged as an exhaust, port 38 being connected by the pipe 24 to the top space of the actuator 3, and port 39 being connected to a supply of air or gas under pressure. Adjustable spring means 40 is provided to urge the diaphragm 32 and valve spindle upwardly into a position in which the valve disc 36 closes the air or gas pressure port 39 and permits communication between the ports 37, 38 so that pneumatic pressure can be released from the top space 20 of the actuator for the opening of the relief valve. When a secondary pneumatic pressure is admitted to the top chamber 33 of the valve device 4, as determined by the pilot control instrument 5, the valve disc 36 is displaced downwardly to close the exhaust port 37 and to open the port 39 so that air or gas pressure can pass to the top space of the actuator where it acts upon the diaphragm assembly 21 in such a manner as to assist the spring 13 in holding the relief or safety valve closed.

Figure 4A:
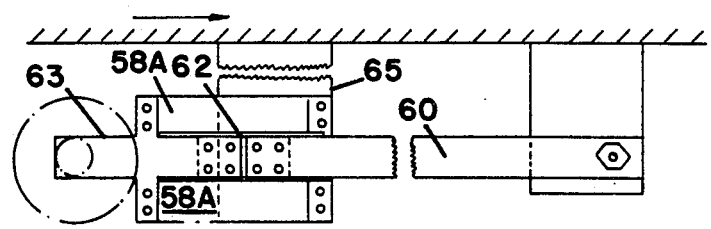
FIG. 4A is a detail in plan along the line IVa—IVa in FIG. 4.
Figure 4:
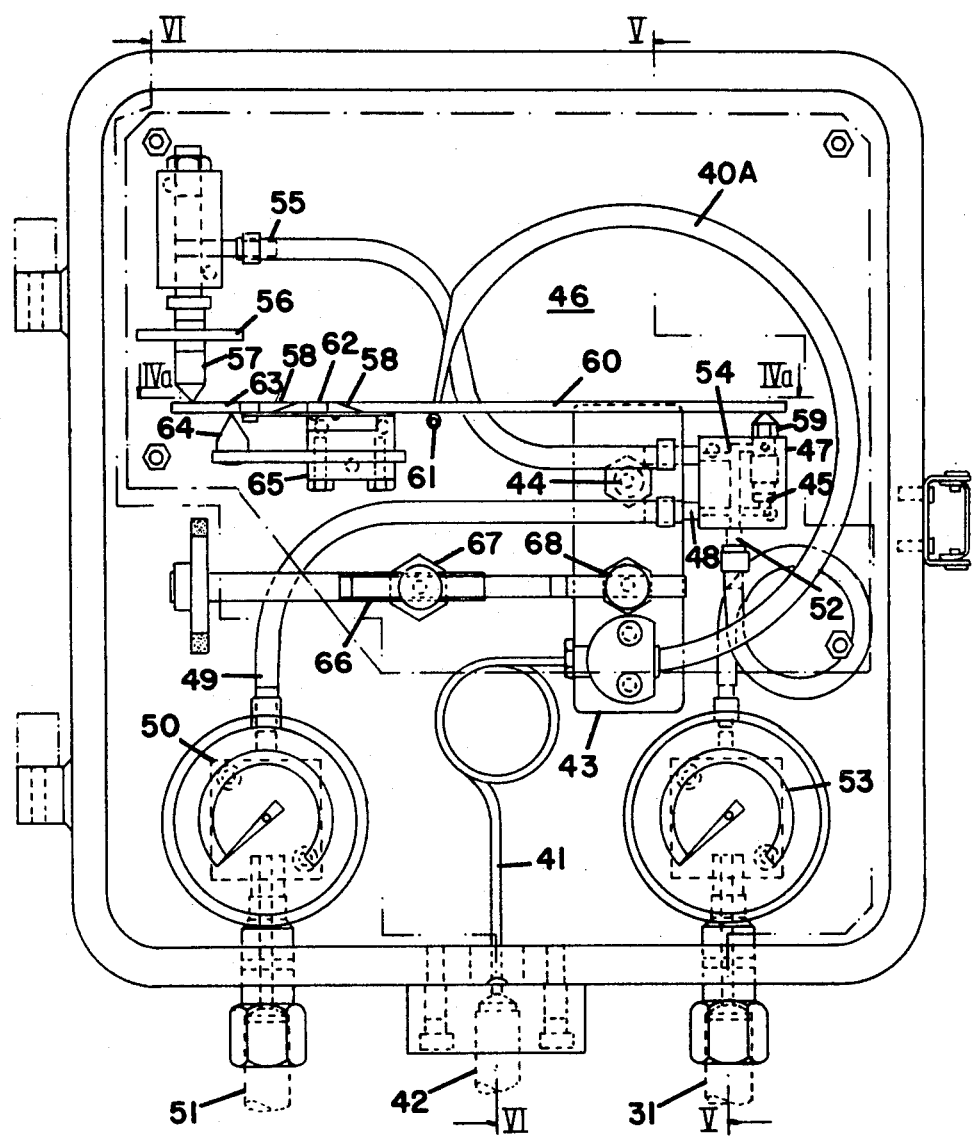
FIG. 4 is a side view of a pilot control instrument of the system.
Figure 5:
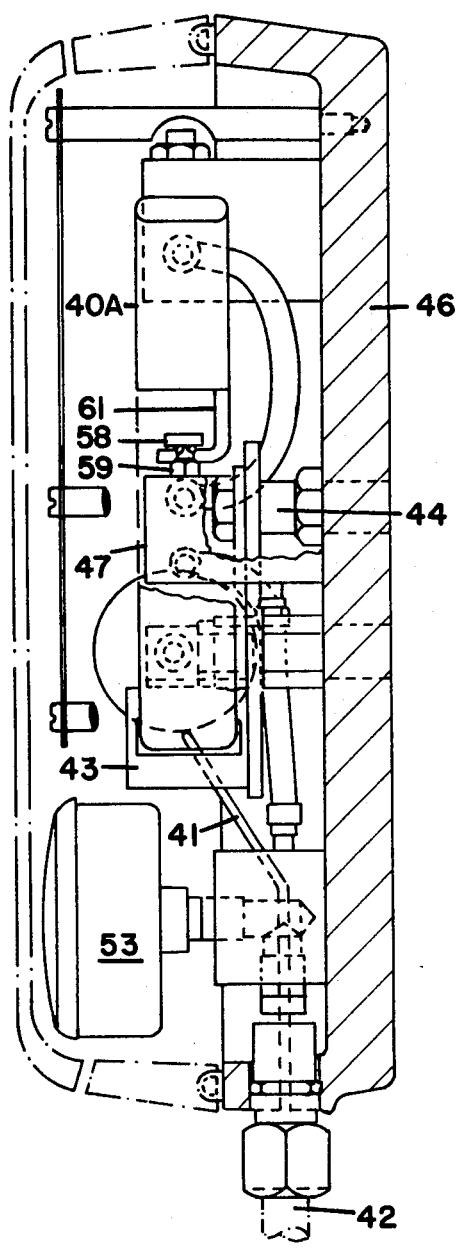
FIG. 5 is a sectional view taken along the line V—V in FIG. 4.
Figure 6:
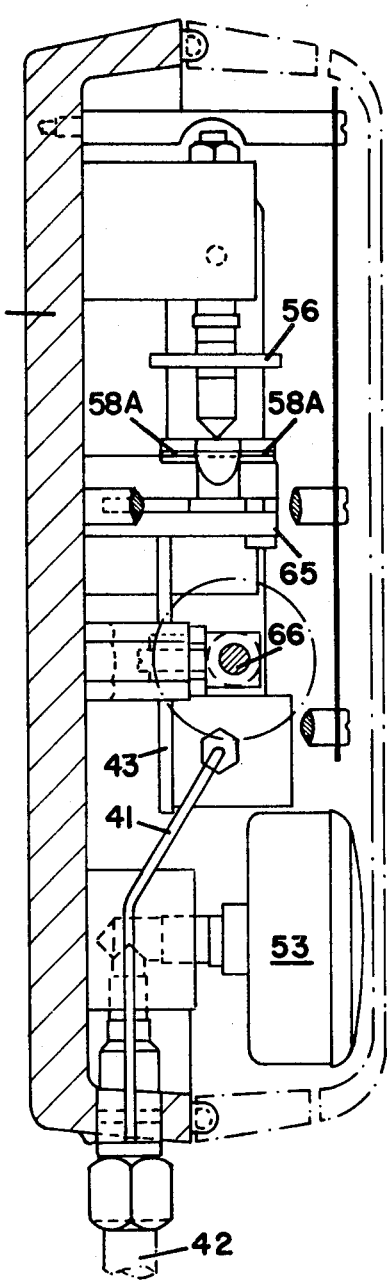
FIG. 6 is a sectional view taken on the line VI—VI in FIG. 4.

The pilot control instrument 5 comprises, as shown in FIGS. 4 to 6, a sensing element consisting of a Bourdon tube 40 connected by a tube 41 to a pipe line 42 leading to the interior of the pressure vessel 2, whereby the fluid pressure to be controlled can be admitted to the Bourdon tube. The Bourdon tube is fixed at its lower end to a plate 43 adjustable angularly about a post 44 secured to a frame 45 fixed to the instrument casing 46. The frame carries a metering device 47 having an inlet 48 connected by a pipe 49 to a manifold block 50 and thence by a pipe 51 to the supply of air or gas pressure. The inlet 48 of the metering device communicates through a throttling orifice with an outlet 52 connected to a manifold block 53 and thence to the pipe line 34 which leads to the top space 33 of the three-way valve 4. The metering device also has a port 54 connected by a tube 55 to an air or gas pressure sensitive feed-back element 56, the latter being operatively connected by a linkage 57 to one end of a flapper indicated generally at 58. The opposite end of the flapper is adapted to rest upon and seal a nozzle 59 of the metering device so as to prevent escape of the operating air or gas pressure supplied to the device through the inlet 48 and metered in the body of the device.

The flapper 58 comprises two parts, there being a long part 60 extending from the nozzle 59 through a stirrup 61 at the tip of the Bourdon tube, the part 60 being hinged at 62, as by a frictionless coupling or pivot means, to a relatively shorter part 64, the free end of the latter engaging the linkage 57. The shorter part 63 of the flapper is arranged for rocking movement about a fulcrum 64 supported on the frame 45. The fulcrum is adjustable longitudinally of the flapper. Adjustable spring means 65 is provided for controlling the rocking movement of the shorter flapper part 63. Alternatively, the flapper parts 60, 63 could be resiliently mounted adjacent their hinged ends upon the frame 45 so that the free end of the shorter part 63 is biased upwardly against an abutment on the underside of the feed back element 56. The stirrup at the tip of the Bourdon tube can be adjusted in position relative to the flapper by rocking the support plate 43, this angular rocking adjustment being effected by a screw device 66 having differential screw-threaded portions engageable respectively in a post 67 fixed to the frame 45 and apost 68 pivotally mounted in the support plate 43, the arrangement providing fine adjustment in the angular setting of the plate 43 and hence in the position of the stirrup on the Bourdon tube relative to the flapper. The direction of this angular adjustment is indicated by a pointer 69 against an associated arbitrary scale. This facilitates the setting of the pilot instrument according to the required relieving pressure.

In operation, the relief valve 1 will be closed by its spring 13, provided the pressure in the vessel 2 remains below the pilot set relieving pressure, the top space 20 of the actuator being open to air or gas pressure through the ON/OFF valve 4. Under these conditions, the Bourdon tube will remain in its normal inoperative condition and the metering device 47 of the pilot instrument together with the feed-back element 56 and the top space 33 of the ON/OFF valve, will be subject to the air or gas supply through the pipe line 51.

Upon the pressure in the vessel 2 rising to the pilot set point, the tip of the Bourdon tube will be deflected to cause the stirrup 61 slightly to lift the flapper part 60 from the mouth of the nozzle 59, this resulting in a pressure drop across the metering device, and a corresponding pressure drop in the feed-back element 56 which lifts the linkage 57 and rocks the shorter flapper part 64 about its fulcrum. Thereby, the hinged end of the flapper part 63 swings downwardly carrying with it the adjacent end of the longer flapper part 60, the latter rocking about a fulcrum formed by the stirrup on the Bourdon tube. The additional leverage provided by the counter-moving parts of the flapper serves to lift the latter further from the mouth of the nozzle. In this matter there is achieved a positive feed-back which is of accumulative reaction and which produces an accelerating motion of the cooperating flapper parts and consequently a rapid fall in the secondary pneumatic pressure obtaining at the outlet side of the metering device and transmitted through the pipe line 34 to the top space 33 of the ON/OFF valve 4. This results in a rapid change-over in the ON/OFF valve whereby air or gas pressure is discharged through the pipe 34 from the top side of the diaphragm 21 of the actuator. This produces an immediate lifting of the relief valve disc 11 to permit a full discharge of excess fluid pressure from the vessel 2.

The relief valve will again close upon the fluid pressure in the valve 2 falling to a pressure determined by the blow-down adjustment of the pilot instrument.

Returning now to FIG. 2 of the drawings, a hand operated lifting gear assembly (74, 75, 76) may be attached, if periodic testing of the valve function is desirable.

Before operating the manual lifting gear, the vessel or system pressure should be reduced to not less than 75% of the valve set pressure, and an isolating valve 73 (see FIG. 1) positioned between ON/OFF valve 4 and the actuator 3 is moved to an OFF position which will allow the supplementary pressure on the actuator diaphragm 21 to be discharged to atmosphere, and allow the actuator spring 27 to raise the actuator assembly a distance, equal to the normal lift of the main valve, thereby removing the supplementary load from the relief valve spindle 12 and allowing free movement of the relief valve spindle via the lost motion coupling 72, as mentioned above.

Referring to FIG. 2, a "pull" of approximately 100 lbs on hand lever 74 lifts forked lever 75 about fulcrum pin 76. The forked lever engages with the lower surface of "lost-motion" coupling 72 which is integral with valve spindle 12 with a screwed connection.

The upward movement of the forked lever is transmitted to the valve spindle 12 through the "lost-motion" coupling thereby lifting the valve seat 11 from the nozzle seating 10.

Repositioning the manual isolating valve 73 to the ON position will automatically return the actuator to the supplementary load condition.

In the event of instrument or mechanical failure to effect the release of the supplementary pressure from the actuator diaphragm the 'fail-safe' mechanism will 'trigger' to a fail-safe position thereby completely isolating the supplementary load from the safety relief valve spindle. In this condition the actuator mechanism will not impose any restriction whatsoever on the conventional operation of the safety relief valve lifting movement.

Under "fail-safe" conditions the safety relief valve will continue to relieve the pressure in the vessel or plant system at the spring set-pressure with normal valve accumulation.

In the supplementary load position the downward thrust generated by air or gas pressure on diaphragm 21 is transmitted by actuator 22 and transferred by the operative parts to the trunnion 26. In this condition, the trunnion transmits the thrust downwards on to a locating shoulder of the intermediate spindle 19 thereby locking the intermediate spindle with the trunnion housing 70. In the latched UP position the actuator rod 22 becomes integral with the intermediate spindle 19 and becomes operative as a single thrust shaft thereby transmitting the supplementary load directly to the safety relief valve spindle 12 and to the disc 11 and nozzle seating 10.

Figure 2A:
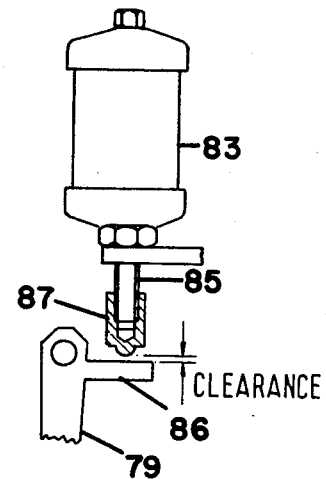
FIG. 2A is a view, to an enlarged scale, of a detail of FIG. 2.

A single acting, spring return slave cylinder 83 is attached to the actuator casing 71. The chamber above the slave piston is communicated with the actuator diaphragm chamber 20 by a balance pipe 84. In the supplementary load condition, air or gas pressure introduced to the top diaphragm chamber 20 will be transmitted to the slave cylinder via the balance pipe and in the same instance depress the slave piston. The stroke of slave piston rod 85 is adjusted to equal that of the total downward movement of the actuator rod 22 and hence equal to the downward movement of the trigger arm 79. In this position piston rod cap 87 (see FIG. 2A) is adjusted to establish a minimum gap clearance of 0.005" between the piston rod cap and a tongue 86 on the trigger arm.

In the event of failure of the control system to release the pressure from the actuator diaphragm the valve will fail safe as follows As the pressure in the vessel or plant system increases, the thrust under the disc 11 will overcome the combined down-thrust of the safety relief valve spring 13 and the applied thrust of the actuator diaphragm 21 thereby producing an upward lift of the relief valve spindle 12 together with the trigger arm 79 thereby urging the tongue 86 against the piston rod cap 87. As the tongue continues to lift against the down thrust of the piston rod cap a "force-moment" is produced about the trigger arm pivot pin 81 causing the trigger arm to pivot radially outwards thereby dis-engaging the latch from the hand lever 77. This disengagement unlocks the trunnion 26 thereby removing the supplementary load instantaneously from the safety relief valve spindle and allows the intermediate spindle 19 to lift without restriction within the lost-motion coupling 72 and the secondary lost motion coupling embodied within the desing of the fail-safe housing 70. The valve will now operate as a conventional safety relief valve, instantaneously relieving the pressure in the vessel or plant system.

The hand-lever 77 must be re-set manually in the "latching-up" position before the supplementary load can be re-imposed.

Positioning the three-way ON/OFF valve 73 in the OFF position will release the supplementary pressure from the diaphragm chamber 20 and with the re-set hand lever maintained in the "down" position will facilitate for faults in the control-system and testing of the actuator assembly to be effected safely while the safety relief valve remains "in-line" and fully operational thereby avoiding costly plant shut-downs.

A warning light conveniently located and wired in to a micro-switch which is depressed by the re-set lever 77 when in the "down" position will indicate that the mechanism has triggered to "fail-safe".

Having described in detail one specific embodiment of the invention above with reference to the drawings, there will now follow a general description of the features and advantages which may be achieved by fluid pressure relief systems according to the invention.

Means is provided for applying a supplementary load to a valve element which is already spring biased to a closed position, and this means may be applied to the spindle of a conventional direct acting safety relief valve.

The supplementary load appears as an additional seat load i.e. loading of the valve element on its seat, and is provided by a power assisted actuator which applies a continuous load at the valve seat, in addition to that of a conventional relief valve spring. Under the influence of the differential gap pilot instrument, the supplementary load is removed and re-applied consistently with respect to the system set pressure. The supplementary load and blow down can be individually adjusted in accordance with the requirement of the particular plant system with which the pressure relief system is operating.

MAIN ADVANTAGES

1. Accurate and consistent control of "blow-down" is achieved.
2. Tight "shut-off" eliminating valve leakage.
3. Supplements for load losses occurring in the main relief valve spring due to either temperature relaxation or creep.
4. Protection against uncontrolled fluctuations of system pressure.
5. Actuator device may be attached to any conventional bonnet style compression spring relief valve.
6. Resultant improved efficiency of plant operation.
7. Fail-safe to conventional spring loaded relief valve operation in the event of air or component failure.

ADJUSTMENT OF SUPPLEMENTARY LOAD

The supplementary load applied to the actuator diaphragm is transmitted to the nozzle and disc of the valve via the actuator spring. The actuator spring provides for immediate and accurate adjustment of the applied supplement-ary load, which can be varied from 2% to 12% of relief valve set pressure applicable as follows:

(a) Power Boilers a maximum adjustment of 8% is provided for normal operation.
(b) Unfired pressure vessels the total supplementary adjustment range of 12% of set pressure may be applied.

MANUAL PRE-SET "FAIL-SAFE" MECHANISM

In the event of instrument or mechanical failure to effect the release of the supplementary pressure from the actuator diaphragm a mechanical "Fail-safe" mechanism is provided.

The mechanism is designed that it will trigger to fail-safe and completely isolate the supplementary load from the safety relief valve proper thereby permitting the valve to lift as a conventional spring loaded safety relief valve without the actuator mechanism imposing any restriction whatsoever on the conventional operation of the spring and disc assembly.

Under "fail-safe" conditions the safety relief valve will continue to relieve the vessel or plant system at set-pressure with normal valve accumulation.

Should any of the control system fail to function then a "once-only" transient rise in pressure will occur according to the application as follows:

(i) Power Boilers: 10% maximum above normal design.
(ii) Unfired pressure vessels: 15% maximum in plant system pressure.

The above pressure rise will be accompanied by an instantaneous removal of the supplementary load occurred by the "triggered" action of the fail safe mechanism. Immediately this event occurs, the Manual pre-set lever will drop to the supplementary OFF position thereby effecting complete isolation of the supplementary load from the safety relief valve spindle. In this condition the three way isolating valve can be manually rotated to the OFF position, thereby evacuating the supplementary pressure from the diaphragm chamber.

The actuator assembly will now ascend to the inoperative position. With the pre-set lever remaining in the "down" position the secondary lost motion coupling which is embodied in the fail-safe housing becomes operative and allows mechanical or control system faults to be safely rectified, serviced and tested while the safety relief valve remains in-line and "on-stream" at normal plant operating pressure thereby minimising costly plant shut-downs.

Resetting the hand lever to the "latched-up" position and re-setting the isolating valve to the ON position will reinstate the supplementary load.

A warning light located on the instrument control panel wired in to a micro-switch operated by the pre-set lever in the "down" position will indicate that the mechanism has "triggered" to fail-safe.

PILOT INSTRUMENT

FIG. 1 shows the application of the relief valve and pilot on a pressure vessel. This arrangement using a miniature three-way ON/OFF diaphragm operated valve relay ensures that the relief valve will open, close and apply the required supplementary load in the shortest desirable time, and enables the pilot to be remotely mounted in the most convenient position.

The three-way ON/OFF valve relay is controlled by a purpose built, differential gap pilot (sold by us under type No. GFP31) of proven design, having simplicity, ruggedness and reliability as the main features.

The ON/OFF differential-gap action is achieved by a positive feedback of back-pressure to the pilot instrument feedback bellows. A change in vessel or system pressure produces a corresponding signal, via the pressure impulse line, which is fed directly to the pilot Bourdon tube. Upon the pressure in the vessel or system rising to the pilot set-point the Bourdon tube will be deflected to lift the flapper arm resulting in a pressure drop in the feed-back bellows. This results in a rapid fall in the secondary pneumatic pressure transmitted to the diaphragm of the three way ON/OFF valve resulting in a rapid change-over of the three way valve to the exhaust position. The supplementary 'air' or gas is immediately discharged from the topside of the diaphragm actuator, thereby allowing an immediate lifting of the relief valve to permit a full discharge of excess fluid pressure from the vessel or plant system.

The relief valve will again close upon the fluid pressure in the vessel or plant system falling to a pressure determined by the 'blowdown' adjustment of the D.G. pilot instrument. The Bourdon tube and the other components of system will thereupon return to their normal inoperative position by a reverse sequence of the valve opening operations and supplementary load will immediately be re-applied to the actuator diaphragm.

The pilot operated supplementary loading relief valve uses an independant air or gas supply for pilot and supplementary loading operation at a regulated pressure of 25 lb/in$^2$. It is generally accepted that the air supply on all modern process plants is clean and reliable.

PLANT AIR FAILURE

The instrumentation as set out above is such that in the event of plant air supply failure the secondary pneumatic pressure to the diaphragm of the three way ON/OFF changeover valve will decay, resulting in a rapid changeover of the three way valve to the exhaust position thereby releasing the supplementary pressure from the topside of the diaphragm.

The actuator spring will raise the diaphragm assembly and actuator spindle to the full lift position in the "lost-motion" coupling such that the valve can lift as a conventional spring-loaded safety relief valve, without the actuator mechanism imposing any restriction whatsoever on the conventional operation of the spring and disc assembly.

HAND LIFTING GEAR

Lifting fear enables the freedom of movement of valve internals to be checked while the plant is in operation and where conditions are such that periodic testing of the valve is desirable.

To operate the lifting gear the vessel or system pressure should be reduced to not less than 75% of the valve set pressure.

Positioning the normal isolating valve to the OFF position the supplementary pressure on the actuator diaphragm will be discharged and the actuator spring will raise the diaphragm actuator assembly upwards thereby removing the supplementary load from the relief valve spindle and will allow free movement of the relief valve spindle through the primary lost-motion coupling.

In this condition a "pull-up" on the hand lifting lever will lift the valve off its seat.

Re-positioning the isolating valve to the ON position the safety relief valve will automatically return to the supplementary load condition.

Figure 7:
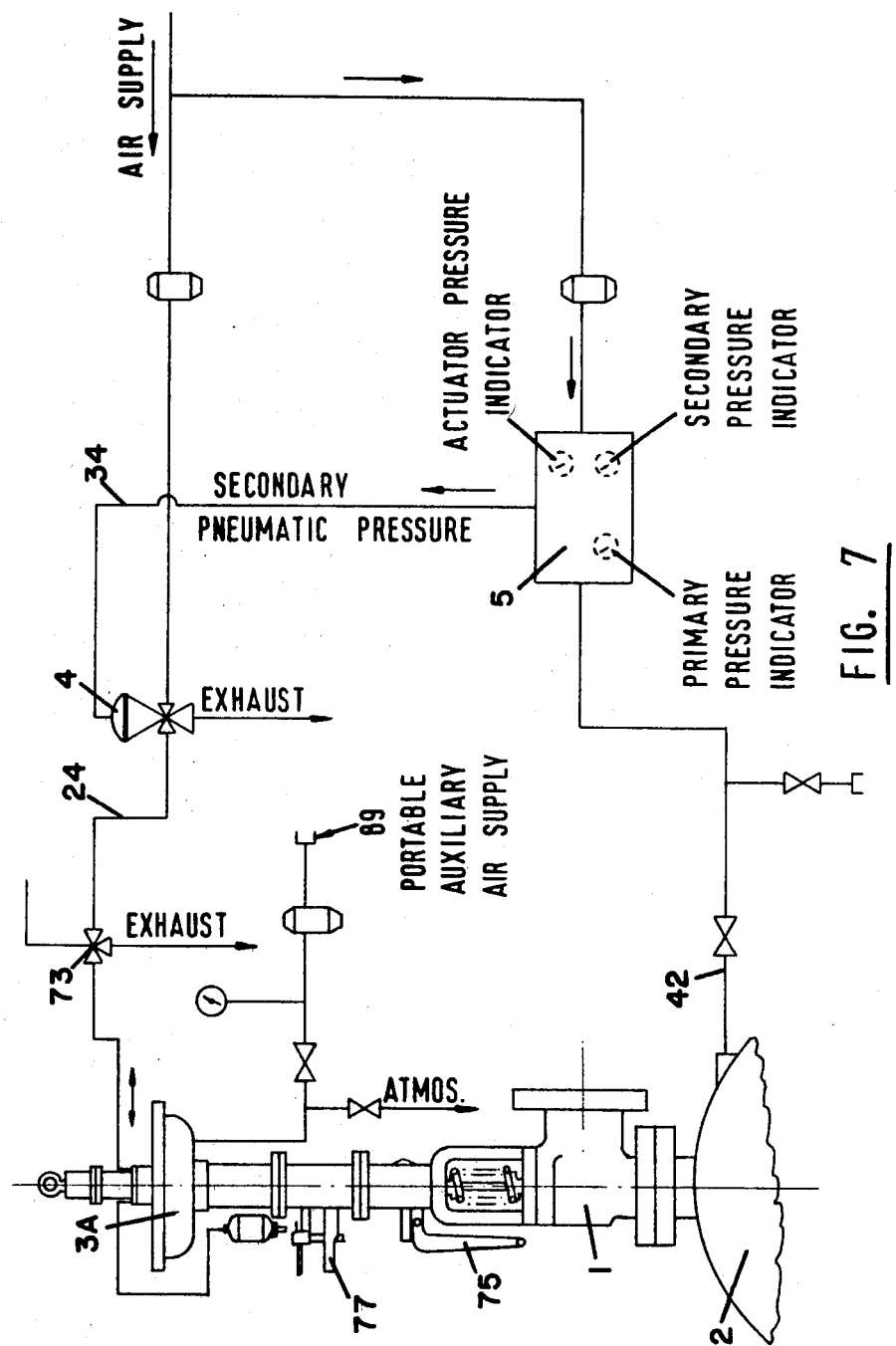
FIG. 7 is a schematic illustration, similar to FIG. 1, of a modified version of actuator for the system.
Figure 8:
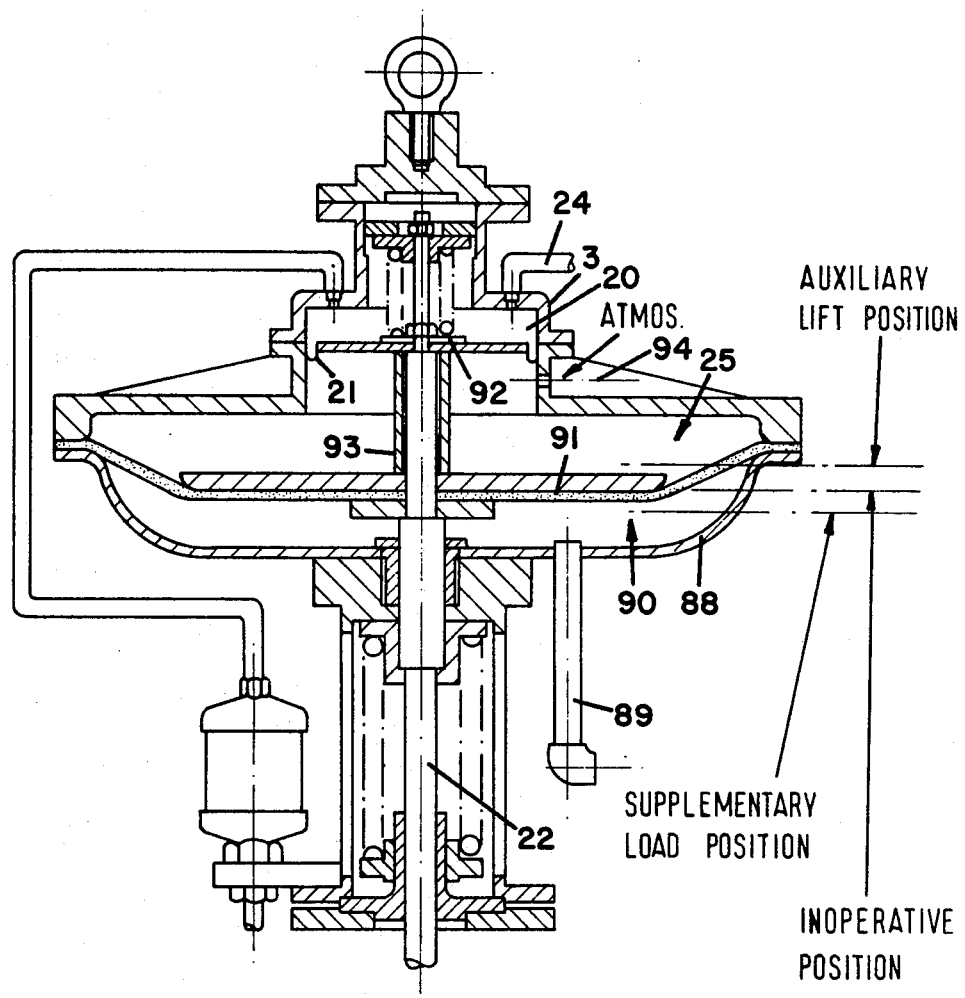
FIG. 8 is a longitudinal sectional view of the modified actuator shown in FIG. 7.

Referring now to FIGS. 7 and 8, there is shown a fluid pressure relief system having a modified actuator, which is generally similar to the system described above with reference to FIGS. 1 to 6 of the drawings, and corresponding parts are designated by the same reference numerals and will not be described in detail again.

Similarly to the actuator 3 of FIGS. 1 and 2, an actuator 3A of FIGS. 7 and 8 functions to apply a supplementary load on the valve element 11 of the relief valve 1 when fluid pressure is introduced into chamber 20 via line 24 under the control of valve 4 and pilot instrument 5. However, the actuator 3A incorporates an auxiliary lifting actuator 88 in which is housed an additional diaphragm 91.

The diaphragm 91 serves, on one side, to define with the diaphragm 21 the chamber 25 (which is connected to atmosphere), but also defines with its other side, within auxiliary actuator 88, a lifting chamber 90 which has a pressure supply line 89 connected thereto. Preferably, the line 89 is supplied with fluid pressure, when required, by means of a portable source of fluid pressure at a control pressure of 40 lbs/in² through a filter regulator. A cylindrical spacer 93 separates the diaphragms 21 and 91, which form an integral assembly on the spindle 22.

During normal operation of the fluid pressure relief system, the chamber 90 remains pressureless, and the auxiliary lifting chamber 88 has no influence on the operation of the actuator 3A and the other parts of the system. However, the auxiliary lifting actuator 88 can be operated during periods of plant shut-down in order to lift the valve disc 11 from its seat 10, as will be described in more detail below.

The supplementary pressure in the upper diaphragm chamber 20 must be evacuated before applying auxiliary pressure in the lower diaphragm chamber 90. By manual positioning the three-way isolating valve 73 to EXHAUST, the actuator assembly will return to the INOPERATIVE position. Referring again to FIG. 2, the manual re-set hand lever 77 must be maintained in the latched UP position. A portable air or nitrogen supply is affixed to the auxiliary line 89. With the filter regulator set at 40 lb/in², air or nitrogen is admitted to the lower diaphragm chamber 90. The complete diaphragm assembly will "lift" to the auxiliary position as shown. The upward thrust will be transmitted by the actuator spindle 22 via the fail safe housing 70 to the underside of the lifting collar 94 on intermediate shaft 19 and thereby lift the lost-motion coupling 72 complete with the relief valve spindle 12 and disc 11.

Referring again to FIG. 8, a return spring 92 serves to ensure that the pilot controlled actuator is returned to the normal inoperative position when the auxiliary air or gas is exhausted from the lower diaphragm.

Figure 9:
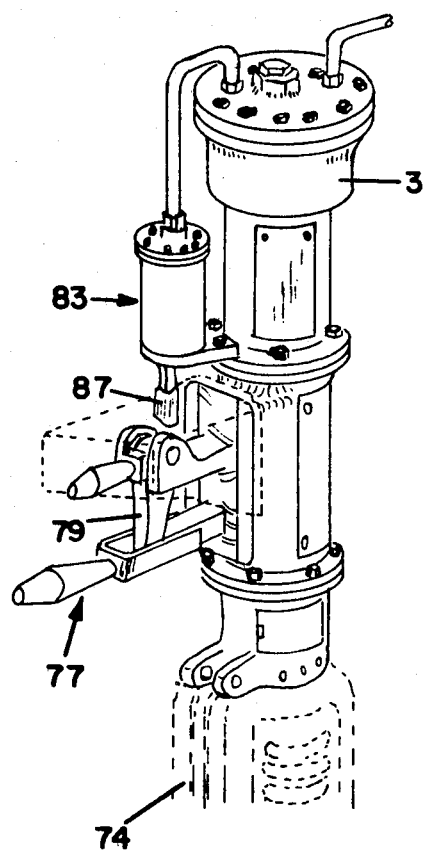
FIG. 9 is an illustration of the manner by which an actuator according to the invention may form an actuator head adapted for mounting on an existing pressure relief valve of a fluid pressure system.

Finally, as will be evident particularly from FIG. 9 of the drawings, the invention provides a detachable actuator head which is adapted to be mounted on, and detached from, any existing relief valve of a fluid pressure system. This provides a significant advantage, both from a technical and also from a financial point of view. Thus, the actuator head can be constructed as a "bolt-on" unit for use with existing relief valves, which is cheaper than manufacturing a composite valve-actuator unit, and enables customers with existing relief valves to purchase and install a separate actuator. Further, by making the actuator detachable, it is possible for maintenance operations to be carried out on the actuator (after detachment from the relief valve) without the necessity to shut down the pressure system which is being controlled by the relief valve (which would be necessary with a composite valve-actuator unit). This is a very significant factor, in that a plant can continue to run without interruption despite maintenance work being carried out on the actuator.

I claim:

1. A fluid pressure relief system comprising:
   a relief valve having a valve seat, and a valve element spring biased to a closed position on said valve seat, said valve element being movable under the action of a fluid pressure medium against its spring biasing in order to allow the escape of the fluid pressure medium through the valve for pressure relief purposes;
   an actuator coupled with said valve element and having a member displaceable in response to fluid pressure applied to said member;
   a linkage coupling together the valve element and the actuator;
   biasing means arranged to oppose displacement of said member of the actuator, when fluid pressure is applied to the member;
   control means for controlling the supply of fluid pressure to said member;
   means for applying fluid pressure to the displaceable member to move the latter to a valve-loading position in which it applies a supplementary valve-closing load to the valve element via said linkage;
   and a fail-safe mechanism coupled with said linkage and forming part of the linkage to move therewith when the displaceable member moves to the valve-loading position, said mechanism being coupled with said linkage in such a way as to be automatically disabled by the linkage when the displaceable member remains unintentionally in the valve-loading position and the valve element carries out relief pressure movement.

2. A fluid pressure relief system according to claim 1, including a lost-motion connection provided in said linkage, said connection allowing the valve element to move against its spring biasing for pressure relief purposes without imparting movement to the displaceable member of the actuator.

3. An actuator head adapted for mounting in a fluid pressure relief system, said relief system comprising a relief valve having a valve element spring biased to a closed position and arranged to be movable under the action of a fluid pressure medium in order to allow the escape of the fluid pressure medium through the valve for pressure relief purposes, in which the actuator head comprises:

an actuator adapted for coupling with said valve element and having a member displaceable in response to fluid pressure applied to said member;

a linkage for coupling together the valve element and the actuator;

biasing means arranged to oppose displacement of said member of the actuator;

control means for controlling the supply of fluid pressure to said member;

means for applying fluid pressure to the displaceable member to move the latter to a valve-loading position in which it applies a supplementary valve-closing load to the valve element via said linkage;

and a fail-safe mechanism coupled with said linkage and operable to transmit a supplementary valve-closing load from the actuator to the valve element and being convertible so as to be automatically disabled by the linkage when the displaceable member remains unintentionally in the valve-loading position and the valve element carries out relief pressure movement, said fail-safe mechansm including a housing arranged in said linkage so as to move therewith during normal operation of the actuator, and a trigger arm arranged to convert the housing into a lostmotion coupling in said linkage when the lift-off force applied to said valve element exceeds the combined loading applied to valve element by its spring biasing and by the supplementary loading applied by said actuator.

4. An actuator head according to claim 3, in which the linkage includes a trunnion mounted in said fail-safe housing, and a lever is pivotally mounted on said housing for movement between a latched position in which it locks the trunnion to the housing for movement therewith and an unlatched, fail-safe position in which the trunnion can carry out lost-motion relative to the housing, the lever being held in its latched position by the trigger arm during normal operation and being unlatched by the trigger arm in its fail-safe mode.

5. An actuator head according to claim 4, in which the fail-safe mechanism includes a slave cylinder having a piston which is exposed to the same pressure as said actuator and has a projecting end which is movable through the same distance as said linkage and said trigger arm when a supplementary valve-closing load is applied by the actuator to the valve element, and in which said trigger arm is engageable by said projecting end so as to unlatch said lever when the trigger arm moves relative to the slave cylinder during its fail-safe mode.

6. An actuator head according to claim 3, including a manually operable lever arrangement for raising the valve element from its seating.

7. An actuator head according to claim 3, including an auxiliary actuator adapted for coupling with said valve element and having an auxiliary member which is displaceable in response to fluid pressure aplied thereto, when no pressure is applied to displaceable member of said actuator, in order to move the valve element away from its closed position during shut-down of a plant employing a fluid pressure medium which is controlled by the fluid pressure relief system.

8. An actuator head according to claim 7, in which the auxiliary actuator has a fluid supply line to which a portable source of fluid pressure medium is attached.

9. An actuator head according to claim 7, in which the auxiliary actuator is connected to an actuating spindle which operates the valve element and to which also said actuator is coupled.

10. An actuator head according to claim 3, in which the actuator head is detachably mounted on said relief valve.

* * * * *